Oct. 25, 1966 G. A. HELLWARTH 3,281,722
SYSTEM FOR SELECTING AND TRACKING AUTOMATICALLY A SINGLE
FREQUENCY COMPONENT OF A COMPLEX SIGNAL
Filed June 28, 1963 3 Sheets-Sheet 1

INVENTOR
GEORGE A. HELLWARTH

BY John A. Harvey

ATTORNEY

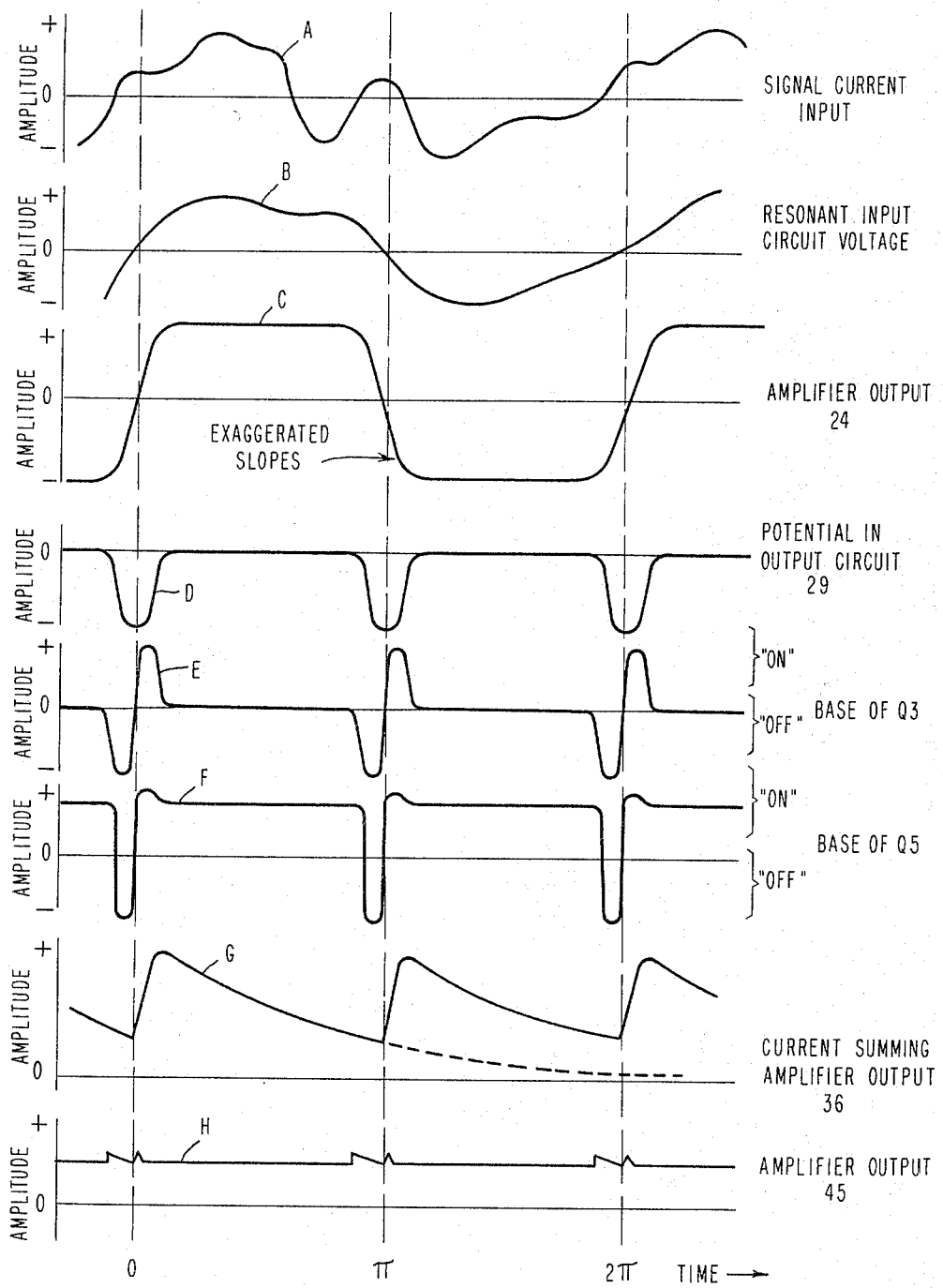

United States Patent Office 3,281,722
Patented Oct. 25, 1966

3,281,722
SYSTEM FOR SELECTING AND TRACKING AUTOMATICALLY A SINGLE FREQUENCY COMPONENT OF A COMPLEX SIGNAL
George A. Hellwarth, Ann Arbor, Mich., assignor to International Business Machines Corporation, New York, N.Y., a corporation of New York
Filed June 28, 1963, Ser. No. 291,431
19 Claims. (Cl. 333—17)

The present invention relates to automatic frequency tracking systems and, particularly, to systems for tracking a predominant frequency component of a signal supplied to the system.

It is often desirable to find and identify each individual frequency component of the many which appear in a signal of complex frequency structure. Depending upon the nature of the signal source, the frequency components may have different and even variable amplitudes and phase or frequency deviations. While systems have heretofore been proposed for automatically tracking a signal having only one frequency or for automatically tracking the carrier signal component of a modulated carrier signal, these are not suitable to select and track automatically a single frequency component of a complex signal. Other proposed frequency analyzing systems enable selection from a complex wave of individual frequency components having relatively stable frequencies, but these systems are unable to follow or track a selected component which is characterized by significant variations of its frequency.

It is an object of the present invention to provide a new and improved automatic frequency tracking system which may select each of the significant frequency components appearing in a signal of complex frequency structure and automatically track the selected component over a substantial range of frequency deviation thereof.

It is a further object of the invention to provide a novel automatic frequency tracking system exhibiting exceptionally high stability and reliability of its frequency-component selection and tracking operational characteristics.

It is an additional object of the invention to provide an automatic frequency tracking system which will identify and exclusively track a prominent frequency component of a complex signal until that component disappears and will then automatically transfer to and identify and exclusively track the most prominent higher-frequency or lower-frequency adjacent frequency component.

Figure 3:
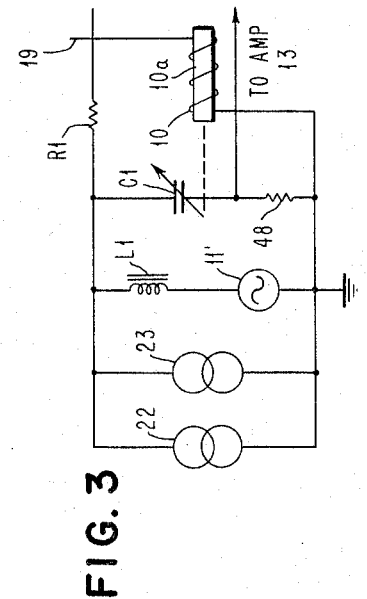
Figure 1A:
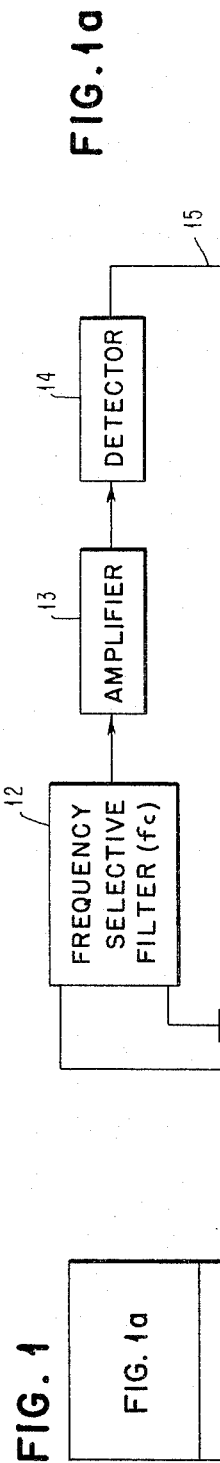
Figure 1:
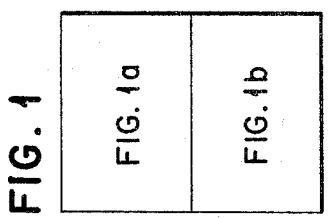
Figure 1B:
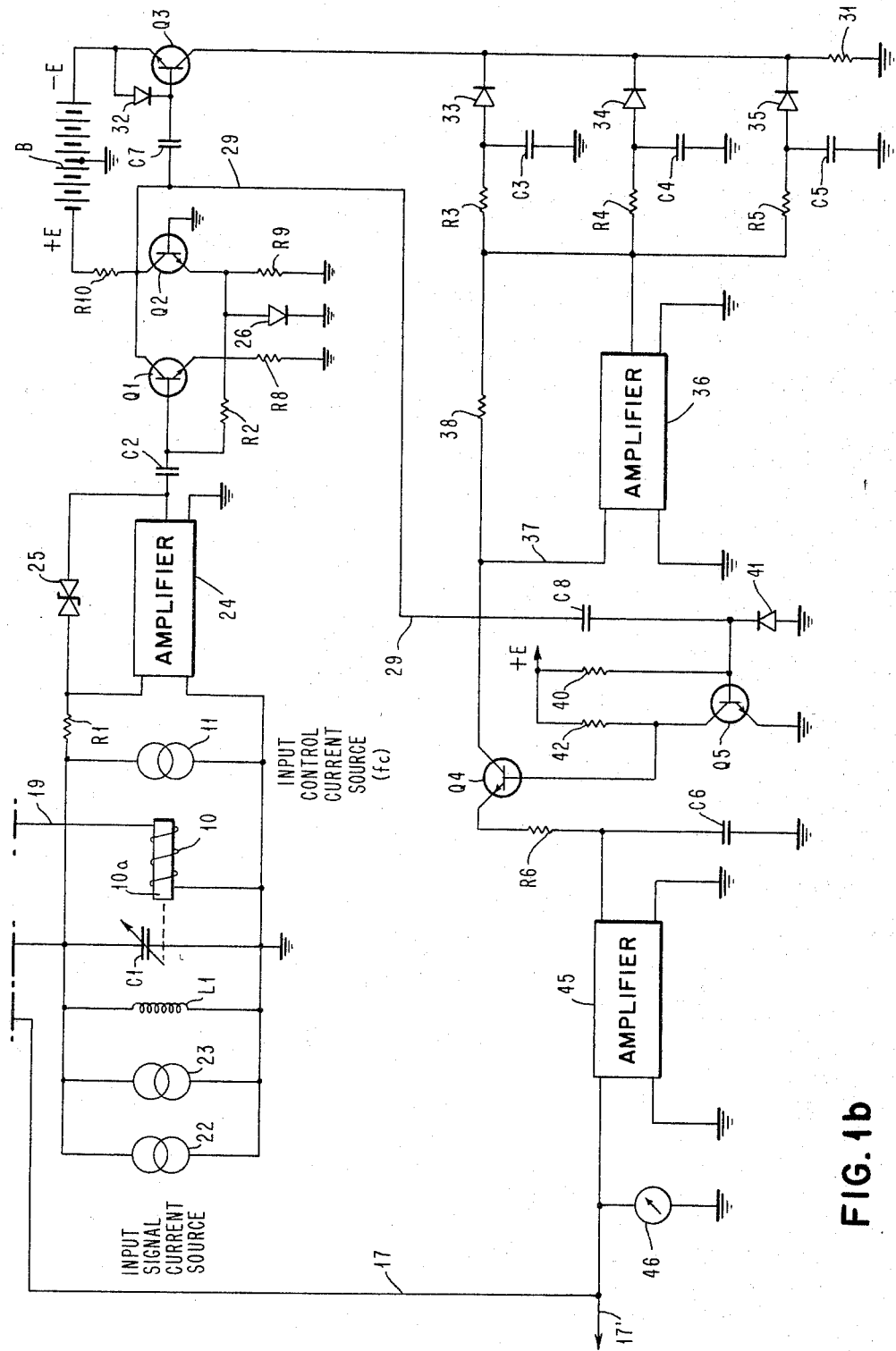

Other objects and advantages of the invention will appear as the detailed description thereof proceeds in the light of the drawings forming a part of this application, and in which:

FIGS. 1a and 1b arranged as in FIG. 1 show the electrical circuit diagram, partly schematic of an automatic frequency tracking system embodying the present invention in a particular form;

FIG. 2 graphically represents voltage waveforms appearing at selected points in the automatic frequency tracking system and is used as an aid in explaining its operation; and FIG. 3 is an electrical circuit diagram showing a modified form of resonant input circuits suitable for use in the tracking system of the invention.

The automatic frequency tracking system, herein described by way of example as embodying a representative form of the invention, has a tunable input circuit to which an input signal of complex waveform is applied. This input circuit is tunable for the purpose of selecting and exclusively tracking the prevailing largest-amplitude frequency component of the input signal while attenuating frequency components other than the one being tracked. To enable controlled tuning of this input circuit, it is convenient to use a tuning condenser having a value dynamically controlled by a control current. This current may be supplied to the winding of a solenoid which has a movable magnetic armature mechanically connected to move a capacitance adjusting element of a tuning condenser, or may be used to control a back-biased junction diode or the control current may be used to control a ferroelectric capacitor or other device providing an electronically variable value of capacitance. Since the value of capacitance of a tuning condenser of these types usually does not vary in a stable linear manner with the value of the control current, the present tracking system utilizes a feedback control system automatically to maintain a linear relationship between the controlled value of reactance of the tuning condenser and the value of a control potential which governs the value of the control current. This feedback control system will be particularly described before describing the overall automatic frequency tracking system which includes the feedback control system.

The tunable input circuit of the automatic frequency tracking system is shown in FIG. 1b as one of the parallel resonant type and includes a fixed inductor L1 connected in shunt to an adjustable condenser C1. A control solenoid has a winding 10 and a longitudinally movable magnetic armature 10a mechanically connected as indicated by the broken line to a movable capacitance-adjusting element of the condenser C1 to control, in accordance with the magnitude of a control current supplied to the winding 10, the prevailing value of capacitance of the condenser C1.

To maintain linearity between the controlled value of capacitance of the condenser C1 and the value of a control potential which governs the value of current flowing through the winding 10, there is impressed across the terminals of the condenser C1 a constant amplitude control current supplied by an input control current source 11 having a frequency $f_c$ much higher than the highest frequency of any input signal with which the automatic frequency tracking system is to be used. The constant amplitude control current of the source 11 produces across the condenser C1 a voltage of frequency $f_c$ and of amplitude varying inversely proportionately to the prevailing value of capacitance of the condenser C1. This terminal voltage is supplied to and is translated by a stable frequency selective filter 12, shown in FIG. 1a, which has a relatively wide pass band characteristic effective to translate the control voltage of frequency $f_c$ and to reject all input signal voltages. The control voltage translated by the filter 12 is amplified by a stable amplifier 13 and is rectified by a stable amplitude detector 14 to derive in an output circuit 15 of the latter a unidirectional voltage having an amplitude varying directly with the amplitude of the control voltage developed across the condenser C1 and thus varying inversely with the capacitance of the latter.

This derived unidirectional voltage is supplied to one input circuit of a conventional stable differential amplifier 16 having a second input circuit 17 to which a unidirectional capacitance-control voltage E1 is supplied. The output voltage of the differential amplifier 16 has a value varying with the difference between the value of the unidirectional voltage developed in the detector output circuit 15 and the value of the control voltage E1 of the control circuit 17. This difference voltage is amplified by a stable amplifier 18 to derive in an output circuit 19 of the latter a control current which is supplied to the control winding 10 and has a value directly proportional to the differential voltage applied to the input circuit of the amplifier 18. The polarity of the gain around the feedback loop comprising the units 12–14, 16 and 18 is selected to be negative, and the value of the overall gain in the feedback loop is selected sufficiently high that the feedback control system produces a value of control current through the winding 10 such as to maintain the value of capacitance of the condenser C1 constant for a constant value of the control potential E1 supplied to the control circuit 17 but to vary the capacitance inversely proportional to the value of the control potential E1. The accuracy with which the feedback control system accomplishes this result is dependent upon the constancy of the frequency and amplitude of the control current supplied by the control source 11, the stability of gain of the units 12–14 and 18, and the stability and differential linearity of the differential amplifier 16. These factors may readily be taken into account by standard design techniques to attain a high degree of linearity between the controlled reciprocal value of capacitance of this condenser C1 and the value of control potential E1 supplied to the control circuit 17.

Consider now the automatic frequency tracking system having the circuit arrangement shown in FIG. 1b. A signal source 22 supplies an input signal current of complex waveform, for example one having the waveform represented graphically by curve A of FIG. 2, to the parallel resonant input circuit comprised by the condenser C1 and inductor L1. For purposes presently to be explained, a source 23 supplies a low amplitude sine wave current at a quiescent "rest" frequency chosen anywhere within the normal frequency spectrum of the input signal current of the source 22. The input signal current of the source 22 produces across the parallel resonant circuit C1, L1 a voltage having frequency components corresponding to the various frequency components of the signal current. This developed voltage will have a predominant frequency component of essentially sinusoidal waveform, represented by curve B of FIG. 2, if the resonant circuit C1, L1 has a Q of approximately five or more and is resonant at the frequency of the predominant component as will occur by automatic operation of the tracking system in a manner presently to be explained. While the tracking system is in process of varying the value of the condenser C1 to tune the resonant circuit C1, L1 to resonance with the predominant frequency component of the voltage developed across the resonant circuit, the fact that the predominant frequency component may not be of sinusoidal waveform is unimportant as will presently become apparent.

The signal voltage developed across the resonant circuit C1, L1 is supplied through a resistor R1 to an overdriven amplifier 24 having a double-anode Zener device 25 degeneratively coupling the output and input circuits of the amplifier. The gain of the amplifier 24 is selected sufficiently high that, in conjunction with the Zener device 25, the amplifier limits or clips the peaks of both the positive and negative half cycles of the signal voltage applied to the amplifier. There is thus developed in the output circuit of the amplifier a signal voltage of rectangular or square waveform having steep leading and lagging waveform edges even for small amplitude signal voltages developed across the input resonant circuit C1, L1. Curve C of FIG. 2 shows a representative waveform for this signal voltage except that, for purposes of clarifying certain aspects of the system operation, the waveform is shown with exaggerated slope in the region of each zero-voltage intercept.

The voltage of rectangular waveform developed in the output circuit of the amplifier 24 is supplied to a differentiating network comprised by a series circuit including a condenser C2 and a resistor R2 which, with a series diode rectifier device 26, is connected across the output circuit of the amplifier 24. A transistor Q1 has its base electrode connected to the condenser C2, has its emitter electrode connected to ground potential through a resistor R8 having the same value of resistance as does the resistor R2, and has its collector electrode connected through a load resistor R10 to the positive potential terminal of an energizing source B connected at an intermediate potential point to ground as shown. A transistor Q2 has its base electrode connected directly to ground, has its emitter electrode connected to ground through a resistor R9 connected in shunt to the diode rectifier device 26, and has its collector electrode connected through the load resistor R10 to the energizing source B. The diode rectifier device 26 is connected with the polarity shown to be rendered conductive on the positive going changes of the rectangular waveform output voltage of the amplifier 24, and the emitter and base electrodes of the transistor Q2 are rendered conductive equally well on the negative going changes of the rectangular waveform output voltage of the amplifier 24. The time constant of the condenser C2 and resistor R2 is relatively short, and each charge of one polarity stored in the condenser C2 during the short conductive intervals of the diode rectifier device 26 and each charge of opposite polarity stored during the short intervals when the emitter and base electrodes of the transistor Q2 are conductive is completely discharged by the resistor R9 between succesive such conductive intervals. There is thus developed in an output circuit 29 of the transistors Q1 and Q2 a negative polarity potential pulse corresponding to each moment when the output potential of the amplifier 24 has a zero value regardless of whether the output voltage is changing from positive to negative or from negative to positive at this moment (i.e. a negative output potential pulse is produced in the output circuit 29 at each "zero crossing" of the rectangular waveform output voltage of the amplifier 24). This output pulse potential has the waveform represented by curve D of FIG. 2, and successive pulses have equal amplitudes by reason of the equality of values of the resistors R2 and R8. It is evident that these negative polarity potential pulses occur at one-half the period of the rectangular waveform output voltage of the amplifier 24 regardless of the instantaneous periodicity of this voltage.

The negative polarity potential pulses developed in the output circuit 29 are differentiated by a condenser C7 coupled to the base electrode of a transistor Q3 of the NPN type having its emitter electrode connected to the mostive negative potential terminal of the energizing source B as shown and having its collector electrode connected through a resistor 31 to ground potential. This potential pulse differentiation is facilitated by a diode rectifier device 32 connected between the base and emitter electrodes of the transistor Q3 to provide a low impedance conductive path for the condenser C7 while each negative potential pulse is increasing in negative amplitude and by the conductive state of the base and emitter electrodes of the transistor Q3 which provide a low impedance conductive path for the condenser C7 while each negative potential pulse is decreasing in negative amplitude. The resultant differentiated potential pulses applied to the base of the transistor Q3 are represented by curve E of FIG. 2, and it will be seen that each negative potential pulse in the output circuit 29 causes successive negative and positive differentiation potential pulses to be applied to the base electrode of this transistor. Each of the positive potential pulses cause the transistor Q3 to become conductive. The transistor Q3 upon being rendered thus conductive charges a plurality of condensers C3, C4 and C5 through respective diode rectifier devices 33, 34 and 35 to a negative potential substantially equal to that applied to the emitter electrodes of the transistor Q3.

The condensers C3, C4 and C5 upon becoming periodically charged in the manner last described discharge during each non-conductive interval of the transistor Q3 through respective resistors R3, R4 and R5 into the input circuit of an amplifier 36 operating as a current summing amplifier due to a degenerative feedback resistor 38. The values of the pairs of condensers and resistors C3 and R3, C4 and R4, and C5 and R5 are selected such that the weighted sum of the three exponential discharge currents of the condensers C3, C4 and C5 produce a time-function potential in the output circuit 37 of the amplifier 36. In particular, the magnitude of this time-function potential varies inversely with the square of time and thus is a function proportional to the square of the prevailing frequency of the rectangular output voltage of the amplifier 24. As will presently be explained, this time-function potential is used to set the prevailing resonant frequency of the system resonant input circuit comprised by the condenser C1 and inductor L1 to equal the prevailing frequency of the rectangular waveform voltage appearing in the output circuit of the amplifier 24.

The negative polarity potential pulses developed in the output circuit 29 of the transistors Q1 and Q2 are coupled through a condenser C8 to the base electrode of a transistor Q5 of the NPN type, the base electrode being conventionally biased fully to saturation by a resistor 40. A diode rectifier device 41 is connected between the base and emitter electrodes of the transistor Q5 to provide, in conjunction with the base-emitter electrodes of the transistor Q5, a bi-polar low-impedance path which facilitates differentiation of the negative potential pulses in the output circuit 29 by the condenser C8. The resultant potential applied to the base electrode of the transistor Q5 is represented by curve F of FIG. 2. The collector electrode of the transistor Q5 includes a load resistor 42 and is connected to the base electrode of a transistor Q4 of the NPN type. Each negative potential pulse applied to the base electrode of the transistor Q5 increases the positive potential applied to the base electrode of the transistor Q4 to render the latter conductive and charge a condenser C6 through a resistor R6 from the output potential developed in the output circuit 37 of the amplifier 36. Thus the negative potential pulses applied to the base electrode of the transistor Q5 cause the transistor Q4 to act as a fast sampling gate by which the voltage developed in the amplifier output circuit 37, and represented by curve G of FIG. 2, is transferred to the condenser C6. It will be noted that this sampled transfer of voltage to the condenser C6 occurs at the tail end of each period of decrease of the time-function voltage generated in the output circuit 37 of the amplifier 36 and just prior to reset of the time-function voltage generator when the transistor Q3 becomes conductive to recharge the condensers C3–C5. The condenser C6 holds the charge transfer voltage, as represented by curve H of FIG. 2, during the intervals between the negative potential pulses applied to the base electrode of the transistor Q5.

The condenser C6, resistor R6, and transistor Q4 comprise a low pass filter having a novel band pass characteristic. The resistor R6 serves to limit the charging current of the condenser C6 during the very short intervals when the gate transistor Q4 is conductive, so that the transient response of this low pass filter can be expressed as a fixed number of the non-conductive intervals of the transistor Q4 or, expressed somewhat differently, as a fixed number of zero crossings of the rectangular waveform potential developed in the output circuit of the amplifier 24. As will be presently pointed out, the latter potential is caused by operation of the tracking system to have a periodicity corresponding to the frequency of the particular frequency component of the input signal which is automatically tracked at any given time by the resonant input circuit, and by reason of this the low pass filter last mentioned is a dynamic one which exhibits a band width proportional to the input frequency component and to the corresponding resonant frequency of the resonant input circuit C1, L1. This operational characteristic of the low pass filter is optimum to maintain stable loop tracking with a constant-Q tunable input circuit, the optimization being in the sense of rapid transient response of the system in tracking a predominant signal frequency component.

The prevailing charge voltage of the condenser C6 is amplified by a conventional unidirectional amplifier 45 to develop a control potential in the control circuit 17. This potential is effective so to control the feedback circuit earlier described in connection with FIG. 1a as to adjust the value of capacitance of the condenser C1 in a direction and to such extent as may be required to render the input resonant circuit C1, L1 resonant at the frequency of the predominant signal component developed across this input circuit by the input signal current of complex waveform. When the input circuit is so resonated, the predominant signal component has sinusoidal waveform as earlier explained and the period of the voltage of rectangular waveform developed in the output circuit of the amplifier 24 corresponds to the period of this sinusoidal frequency component voltage. This causes the tracking system to be non-responsive to other less dominant signal frequency components developed across the input circuit C1, L1. The system will accordingly automatically track the predominant signal frequency component if the frequency of this component should change. The output potential of the unidirectional voltage amplifier 45 has a magnitude which indicates the prevailing location at which tracking is effected, and this potential may be measured by a direct-current meter 46 having a scale calibrated to identify the frequency of each signal component tracked by the system. This potential may also be supplied through an output circuit 17' for utilization as desired by other utilizing equipment, not shown. Since the tracking system will automatically tune to and automatically track a prominent signal frequency component of a complex waveform input signal, the disappearance for any reason of the signal component upon which tracking is maintained at a given time will cause the system automatically to tune to and track some new dominant frequency component of the input signal. Upon the disappearance of the input signal, the system will automatically tune to and remain at the frequency of the low amplitude sine wave quiescent signal of the input source 23 which has a quiescent "rest" frequency selected somewhere within the frequency spectrum of input signals normally supplied to the system.

It was previously explained that the weighed sum of the exponential discharge currents of the condensers C3, C4 and C5 decreases with increasing period of the half cycle of the rectangular waveform voltage developed in the output circuit of the amplifier 24. By selection of the values of the condensers C3–C5 and resistors R3–R5, the output voltage of the amplifier 45 considered as a function of frequency of the signal frequency component being tracked may be made the same as the tuning characteristic of the tunable input circuit C1, L1 or, expressed differently, the amplitude of such output voltage may be considered to vary as a function of the resonant frequency produced in the tuned circuit C1, L1 by the output voltage.

FIG. 3 is a circuit diagram of a modified form of tunable input circuit suitable for use in the tracking system. This input circuit is similar to that shown in FIG. 1b in that it employs an adjustable condenser C1 having a value controlled by the solenoid 10 and 10a, but differs from the latter in that a voltage signal source 11' is connected in series with the inductor L1 and an output control circuit resistor 48 is connected in series with the adjustable condenser C1 as shown. In the present input circuit, the frequency of the control source 11' is much lower than the lowest frequency component in the frequency spectrum of the signal supplied to the input circuit from the signal source 22, and the resistor 48 has a value much less than the lowest value of signal reactive impedance of the condenser C1.

The important advantages and diversity of the impedance stabilizing feedback system shown and described in connection with FIGS. 1a and 1b, and shown in modified form in FIG. 3 will be evident. The feedback system may not only be used to stabilize the value of an electrical component normally used with a desired fixed impedance value but, as particularly described herein, additionally provides stabilized variation of the value of an electrical impedance component and in doing so maintains high linearity between the change of component value and the value of a control electrical voltage or current. In contrast, the usefulness of electrically variable impedances has previously been limited by the long-term instability of the impedance component, by unprecise component electrical characteristics, by the component's sensitivity to temperature changes, and to other like factors. The feedback system herein described reduces the effect of all such factors as last mentioned in causing undesirable impedance uncertainties and changes, and does this in proportion to the amount of feedback loop gain employed.

It will be apparent from the foregoing description of the invention that an automatic frequency tracking system embodying the invention may readily select each of the significant frequency components appearing in a signal of complex frequency structure and will automatically track the selected component over a substantial range of frequency deviation thereof. The tracking system of the invention has the further advantage that it exhibits exceptionally high stability and reliability of its frequency-component selection and tracking operational characteristics, and provides positive identification and exclusive tracking of a prominent frequency component of a complex signal until that component disappears whereupon the system will then automatically transfer to and identify and exclusively track the most prominent adjacent frequency component.

While a specific form of the invention has been described for purposes of illustration, it is contemplated that numerous changes may be made without departing from the spirit of the invention.

What is claimed is:

1. An automatic frequency tracking system comprising
    adjustable frequency-selection means having relatively sharp frequency selectivity adjustable to any frequency within a preselected frequency range and effective to select and continuously to translate one frequency component of a signal applied continuously thereto and substantially to attenuate the translation of other prevailing signal frequency components,
    means responsive to the frequency components translated by said selection means for deriving therefrom an alternating signal of symmetrical rectangular waveform having successive half cycles of period corresponding to that of the prevailing largest-amplitude frequency component continuously translated by said selection means, means for differentiating said alternating signal to derive a periodic pulse signal and for utilizing said pulse signal to derive a unidirectional control signal having a value varying exclusively with the frequency of said largest-amplitude frequency component and independent of the amplitude thereof,
    and means for utilizing said unidirectional signal to control adjustments of said selection means and maintain said selection means selectively adjusted for substantially optimized continuous translation of said largest-amplitude translated frequency component irrespective of any variations of frequency thereof.

2. An automatic frequency tracking system comprising
    adjustable frequency-selection means having relatively sharp frequency selectivity and including adjustable impedance means responsive to the value of a control signal for adjusting the optimum frequency selectivity of said selection means to any frequency within a preselected frequency range to select and translate frequency components of a signal applied to said selection means, means for deriving a first unidirectional potential having a value varying with adjustments of said impedance means,
    means responsive substantially exclusively to the prevailing largest-amplitude frequency component translated by said selection means for deriving a second unidirectional potential having a value varying exclusively with the frequency of said largest-amplitude frequency component and independent of the amplitude thereof,
    and means jointly responsive to the differential of said first and second unidirectional potentials for deriving and supplying to said impedance means a control signal of prevailing value effective to maintain said selection means selectively adjusted for substantially optimized translation of said largest-amplitude translated frequency component irrespective of any variations of frequency thereof.

3. An automatic frequency tracking system comprising
    electrical impedance means having an impedance value varying non-linearly with the value of a unidirectional electrical control signal supplied thereto,
    means including said impedance means for deriving a first unidirectional potential having an amplitude varying with the value of said impedance means and for providing an electrical frequency-selective network having a band pass translation characteristic and an insertion loss adjustable, with adjustments of the value of said impedance means, to minimum loss value at any frequency within a preselected frequency components of a signal applied thereto,
    means responsive to the prevailing largest-amplitude frequency component translated by said network for deriving a second unidirectional potential having an amplitude varying with the frequency of said largest-amplitude frequency component and independently of the amplitude thereof;
    and means jointly responsive to said first and second unidirectional potentials for deriving and supplying to said impedance means a unidirectional control signal having a prevailing value which maintains said network adjusted for substantially minimized insertion loss at the prevailing frequency of said largest-amplitude translated frequency component.

4. An automatic frequency tracking system comprising
    electrical impedance means having an impedance value varying non-linearly with the value of a unidirectional electrical control signal supplied thereto,
    means including said impedance means and an alternating current energizing source therefor for deriving a first unidirectional potential having an amplitude varying with the value of said impedance means and for providing an electrical frequency-selective network having a band pass translation characteristic and an insertion loss adjustable, with adjustments of the value of said impedance means, to minimum loss value at any frequency within a preselected frequency range excluding the frequency of said source and effective to select and translate frequency components of a signal applied thereto;
    means responsive to the prevailing largest-amplitude signal frequency component translated by said network for deriving a second unidirectional potential having an amplitude varying with the frequency of said largest-amplitude frequency component and independently of the amplitude thereof;

and means jointly responsive to said first and second unidirectional potentials for deriving and supplying to said impedance means a unidirectional control signal having a prevailing value which maintains said network adjusted for substantially minimized insertion loss at the prevailing frequency of said largest-amplitude translated frequency component.

5. An automatic frequency tracking system comprising
electrical impedance means having an impedance value varying non-linearly with the value of a unidirectional electrical control signal supplied thereto;

means including said impedance means and a relatively high frequency energizing source therefor for deriving a first unidirectional potential having an amplitude varying with the value of said impedance means and for providing an electrical frequency-selective network having a band pass translation characteristic and an insertion loss adjustable, with adjustments of the value of said impedance means, to minimum loss value at any frequency within a preselected relatively low frequency range excluding frequency of said source and effective to select and translate frequency components of a signal applied thereto;

means responsive to the prevailing largest-amplitude signal frequency component translated by said network for deriving a second unidirectional potential having an amplitude varying with the frequency of said largest-amplitude frequency component and independently of the amplitude thereof;

and means jointly responsive to said first and second unidirectional potentials for deriving and supplying to said impedance means a unidirectional control signal having a prevailing value which maintains said network adjusted for substantially minimized insertion loss at the prevailing frequency of said largest-amplitude translated frequency component.

6. An automatic frequency tracking system comprising
electrical impedance means having an impedance value varying non-linearly with the value of a unidirectional electrical control signal supplied thereto;

means for deriving a first unidirectional potential having an amplitude varying with the value of said impedance means, means including said impedance means in an electrical frequency-selective network having a band pass translation characteristic and an insertion loss adjustable, with adjustments of the value of said impedance means, to minimum loss value at any frequency within a preselected frequency range and effective to select and translate frequency components of a signal applied thereto;

means responsive to the prevailing largest-amplitude frequency component translated by said network for deriving a second unidirectional potential having an amplitude varying with the frequency of said largest-amplitude frequency component and independently of the amplitude thereof;

and means jointly responsive to said first and second unidirectional potentials for deriving and supplying to said impedance means a unidirectional control signal having a prevailing value which maintains said network adjusted for substantially minimized insertion loss at the prevailing frequency of said largest-amplitude translated frequency component.

7. An automatic frequency tracking system comprising
electrical impedance means having an impedance value varying non-linearly with the value of a unidirectional electrical control signal supplied thereto;

means responsive to alternating current energization of said impedance for deriving a first unidirectional potential having an amplitude varying with the value of said impedance means;

electrical frequency-selective network including said impedance means as a component thereof and having a band pass translation characteristic and an insertion loss adjustable, with adjustments of the value of said impedance means, to minimum loss value at any frequency within a preselected frequency range and effective to select and translate frequency components of a signal applied thereto;

means responsive to the prevailing largest-amplitude signal frequency component translated by said network for deriving a second unidirectional potential having an amplitude varying with the frequency of said largest-amplitude frequency component and independently of the amplitude thereof;

and means differentially responsive to said first and second unidirectional potentials for deriving and supplying to said impedance means a unidirectional control signal having a prevailing value which maintains said network adjusted for substantially minimized insertion loss at the prevailing frequency of said largest-amplitude translated frequency component.

8. An automatic frequency tracking system comprising
electrical impedance means having an impedance value varying non-linearly with the value of a uni-directional electrical control signal supplied thereto;

means including a source of relatively high frequency electrical energy for energizing said impedance means to derive a first unidirectional potential having an amplitude varying with the value of said impedance means;

means including said impedance means for providing a frequency-selective electrical network having relatively sharp frequency selectivity adjustable, with adjustments of the value of said impedance means, to any frequency within a preselected frequency range and effective to select and translate one frequency component of a signal applied thereto and substantially to attenuate the translation of other prevailing signal frequency components;

means responsive substantially exclusively to the prevailing largest-amplitude frequency component translated by said network for deriving a second unidirectional potential having an amplitude varying exclusively with the frequency of said largest-amplitude frequency component and independent of the amplitude thereof;

and means jointly responsive to said first and second uni-directional potentials for deriving and supplying to said impedance means a unidirectional control signal having a prevailing value which maintains said selective network selectively adjusted for substantially optimized translation of said largest-amplitude translated frequency component irrespective of any variations of frequency thereof.

9. A variable electrical impedance comprising
electrical impedance means having an impedance value varying non-linearly with the value of a uni-directional electrical control signal supplied thereto, means for energizing said impedance means with alternating electrical energy to derive a first uni-directional potential having an amplitude varying with the value of said impedance means, a control circuit to receive a uni-directional impedance control potential, and means coupled to said control circuit and jointly responsive to the differential of said uni-directional potentials for deriving and supplying to said impedance means a uni-directional control signal having a value which maintains a linear proportionality between the impedance value of said impedance means and the value of said impedance control potential.

10. A variable electrical impedance comprising
electrical capacitive impedance means having a capacitive impedance value varying non-linearly with the value of a uni-directional electrical control signal supplied thereto, means responsive to energization of said impedance means with high frequency alternating electrical energy to derive a first uni-directional potential having an amplitude varying inversely with the value of capacitance of said impedance means, a control circuit to receive a uni-directional impedance control potential, and means coupled to said control circuit and differentially responsive to said uni-directional potentials for deriving and supplying to said impedance means a uni-directional control signal having a value which maintains a linear proportionality between the value of capacitive impedance of said impedance means and the value of said impedance control potential.

11. A variable electrical impedance comprising electrical impedance means having an impedance value varying non-linearly with the value of a uni-directional electrical control signal supplied thereto, means for energizing said impedance means with a constant value of alternating electrical current, means responsive to the alternating voltage developed across said impedance means by energization thereof for deriving a first uni-directional potential having an amplitude varying with the value of said impedance means;

a control circuit to receive a uni-directional impedance control potential;

and means coupled to said control circuit and including a differential amplifier differentially responsive to said uni-directional potentials for deriving and supplying to said impedance means a uni-directional control signal having a value which maintains a linear proportionality between the impedance value of said impedance means and the value of said impedance control potential.

12. An automatic frequency-component tracking system comprising an input circuit adapted to have applied thereto an electrical signal of complex waveform composed of a plurality of individual frequency components each having individual amplitude and indivdual frequency wthin a frequency range, adjustable frequency-selection means coupled to said input circuit and having relatively sharp frequency selectivity to select and continuously to translate one prevailing frequency component of said signal and substantially to attenuate the translation of other prevailing frequency components thereof, adjustable means included in said frequency-selection means adjustably to tune said selection means to any frequency within said frequency range, means responsive to successively recurrent transitions through zero value of the composite prevailing frequency components translated by said selection means for deriving a control signal having a value varying exclusively with the frequency of the prevailing largest-amplitude signal frequency component regardless of its frequency value within said range and independent of its amplitude and independent of the frequencies and amplitudes of all other of said frequency components, and means operative at a sampling period related to the period of said largest-amplitude frequency component for briefly sampling at said sampling period the amplitude values of said control signal to control by said sampled amplitude values thereof adjustments of said adjustable means and maintain said selection means selectively adjusted for substantially optimized continuous translation of said largest-amplitude translated frequency component irrespective of its frequency position within said range and irrespective of any variations of frequency thereof within said range.

13. An automatic frequency-component tracking system according to claim 12 wherein said control signal deriving means includes amplitude-clipping means for clipping at preselected amplitude values the positive and negative half-cycles of the composite prevailing frequency components translated by said selection means, and wherein said control signal is derived from said clipped-amplitude composite prevailing frequency components.

14. An automatic frequency-component tracking system according to claim 13 wherein said amplitude-clipping means includes means for amplifying said composite prevailing frequency components translated by said selection means, and wherein said clipping means after amplification of said frequency components effects said clipping of the amplitude values of the composite prevailing frequency components to identify the dominant half-cyclic interval of the frequency components translated by said selection means and thereby identify the frequency of said prevailing largest-amplitude frequency component.

15. An automatic frequency-component tracking system according to claim 14 wherein the output amplified and clipped signal of said clipping means is an alternating signal of substantially rectangular waveform having a periodicity corresponding to that of said prevailing largest-amplitude frequency component.

16. An automatic frequency-component tracking system according to claim 15 wherein said control signal has a time-function amplitude characteristic proportional to the square of the prevailing frequency of said alternating signal of rectangular waveform.

17. An automatic frequency-component tracking system according to claim 16 wherein said control means is operative under control of said derived control signal at a sampling period equal to one-half the period of said largest-amplitude frequency component.

18. An automatic frequency-component tracking system according to claim 12 wherein said control means is operative under control of said derived control signal at a sampling period equal to one-half the period of said largest-amplitude frequency component.

19. An automatic frequency-component tracking system comprising an input circuit adapted to have applied thereto an electrical signal of complex waveform composed of a plurality of individual frequency components having individual amplitudes and frequencies within a frequency range, a parallel-resonant circuit including an inductor and a variable condenser coupled to said input circuit and having relatively sharp frequency selectivity circuit to select and translate a prevailing one of said frequency components and substantially to attenuate the translation of others thereof, a source of control current coupled to said resonant circuit and having a frequency outside of said frequency range to derive an alternating current control potential having an amplitude varying in inverse proportion to the prevailing capacitance of said condenser, a selective filter for selecting said alternating control potential substantially to the exclusion of said electrical signal frequency components, a differential amplifier having two differential input circuits, an amplifier coupling said selective filter through an amplitude detector to one of said differential amplifier input circuits to derive from said alternating control potential and apply thereto a first uni-directional control potential of amplitude varying with the amplitude of said alternating current control potential, an amplifier-clipper coupled to said resonant circuit for deriving from signal frequency components translated thereby an alternating signal of rectangular waveform having a periodicity corresponding to that of the prevailing largest-amplitude one of said signal frequency components, a differentiating circuit coupled to said amplifier-clipper and responsive to the successively recurrent transitions through zero value of said signal of rectangular waveform for deriving a signal of periodic-pulse waveform, means coupled to said differentiating circuit and including a plurality of resistor-condenser networks and a summing amplifier for deriving a uni-directional signal having a time-function amplitude characteristic proportional to the frequency of said signal of rectangular waveform, means responsive to said signal of periodic pulse wave form for periodically sampling said time-function signal to derive and apply to the other input circuit of said differential amplifier a second uni-directional control signal, and means responsive to the differential output of said differential amplifier for controlling adjustments of said variable condenser to maintain said parallel-resonant circuit selectively adjusted for substantially optimized translation of said largest-amplitude signal frequency component irrespective of its frequency position within said range and irrespective of any variations of frequency thereof within said range.

References Cited by the Examiner

UNITED STATES PATENTS

| | | | |
|---|---|---|---|
| 2,639,373 | 5/1953 | Goodrich | 325—469 |
| 2,812,430 | 11/1957 | Gierwiatowski | 334—16 |
| 3,022,471 | 2/1962 | Mork | 333—17 |
| 3,069,637 | 12/1962 | Seeley | 334—16 |

HERMAN KARL SAALBACH, *Primary Examiner.*

P. L. GENSLER, *Assistant Examiner.*